(No Model.) 2 Sheets—Sheet 1.
N. SMITH & J. HAYDOCK.
VEHICLE WHEEL.
No. 510,203. Patented Dec. 5, 1893.
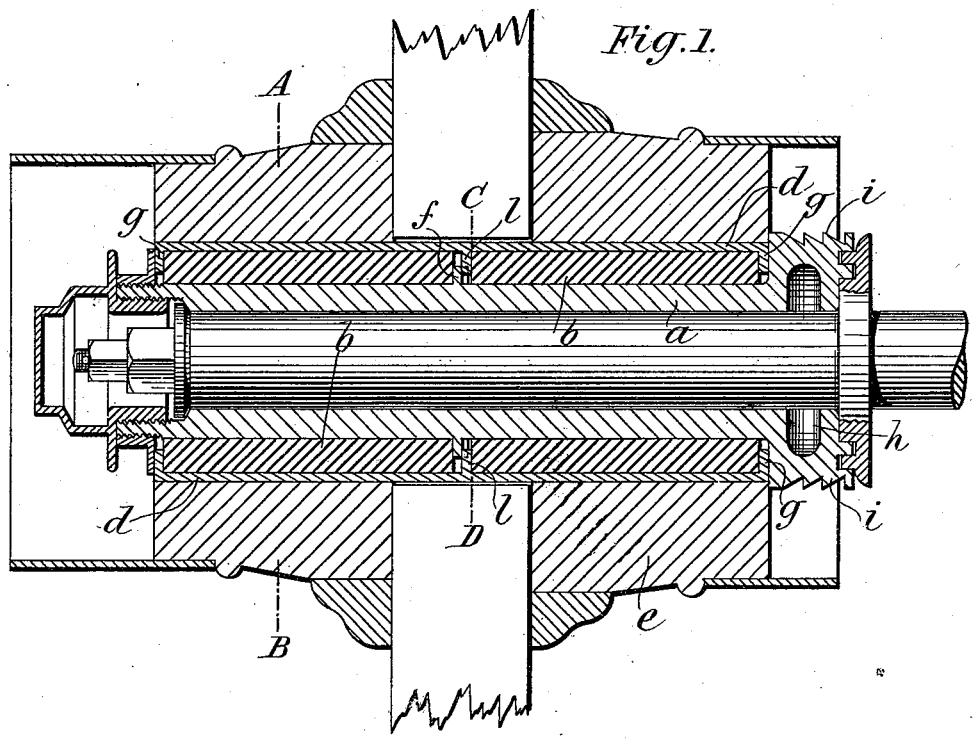
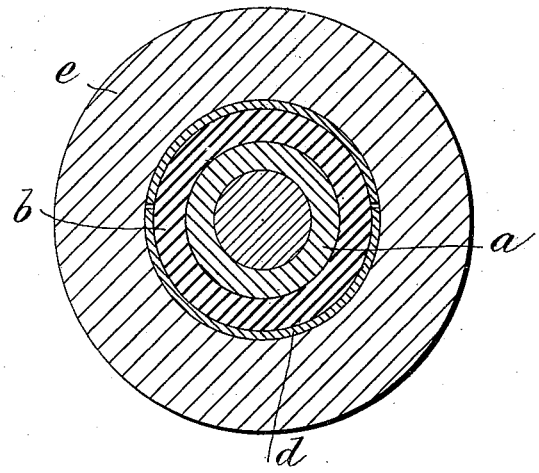
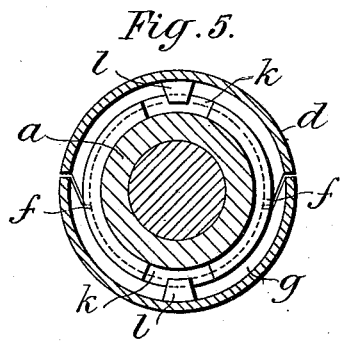
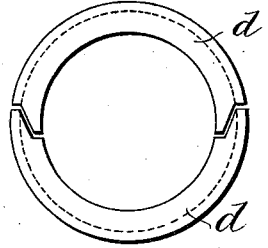
Witnesses.
Inventors.
Nathan Smith
John Haydock

UNITED STATES PATENT OFFICE.

NATHAN SMITH, OF GREAT HARWOOD, AND JOHN HAYDOCK, OF BLACKBURN, ENGLAND.

VEHICLE-WHEEL.

SPECIFICATION forming part of Letters Patent No. 510,203, dated December 5, 1893.

Application filed September 14, 1893. Serial No. 485,529. (No model.)

*To all whom it may concern:*

Be it known that we, NATHAN SMITH, residing at Allsprings, Great Harwood, and JOHN HAYDOCK, residing at 35 Mincing Lane, Blackburn, in the county of Lancaster, England, subjects of the Queen of Great Britain, have invented certain new and useful Improvements in Vehicle-Wheels, of which the following is a specification.

This invention relates to improvements in mounting the wheels of carriages and other vehicles, the object being to prevent vibration, necking of the spokes, rattling of the wheels, and wear and tear generally. According to this invention we employ a flanged bush or box, and around the outer portion of such box or bush we place one or more layers of rubber which are inclosed by a covering of metal made in either two or more segmental pieces, the whole being inserted into the nave or hub of the wheel.

Such being the nature and object of our said invention, the following is a complete description of the same, reference being had to the accompanying drawings, in which—

Figure 2:
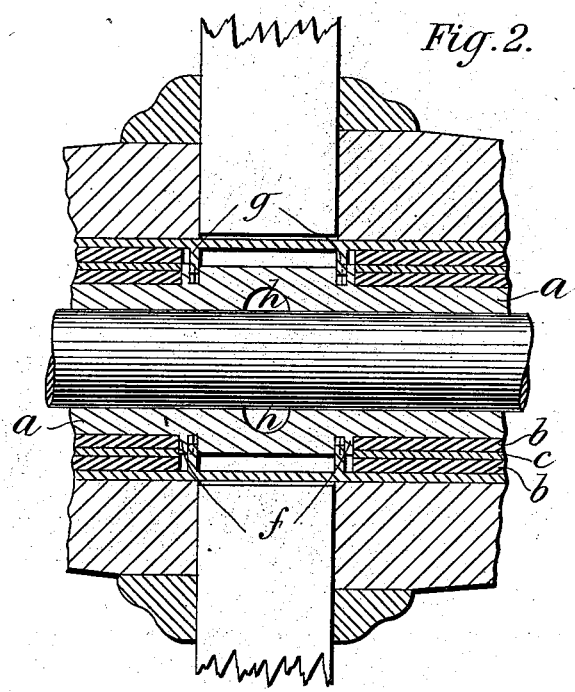
Figure 3:
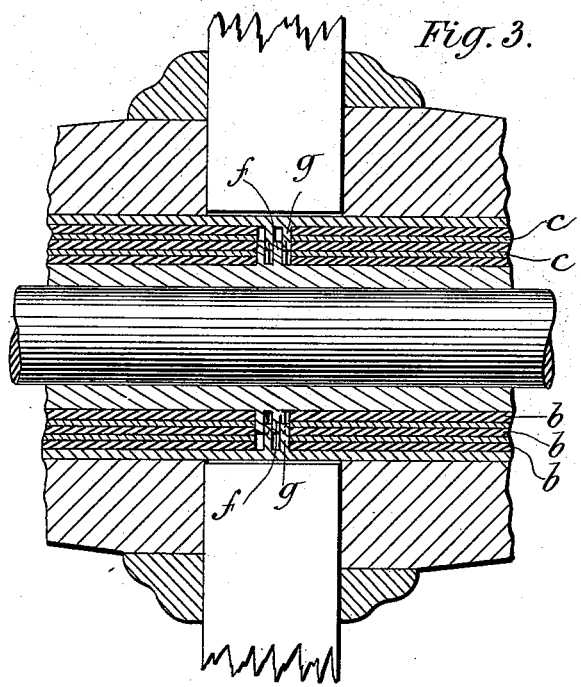

Figure 1 is a longitudinal section of the hub or nave of a wheel constructed in accordance with this invention and showing the rubber applied in two cylindrical portions. Fig. 2 shows double rings of rubber separated by a thin metal plate. Fig. 3 shows three rings of rubber with two interposed plates. Fig. 4 is an end sectional view on line A—B of Fig. 1. Fig. 5 is a sectional view on line C—D of Fig. 1, looking in the direction indicated by the arrow. Fig. 6 is an end view of the segmental metal covering for the rubber.

According to this invention we employ a flanged bush or box $a$, and around the circumference of same is placed a thick covering of rubber $b$, and such rubber may be in one piece, two pieces (as shown by Fig. 1) or in more pieces as for instance rings or disks of rubber placed side by side.

For heavy vehicles a series of rings of rubber $b\ b$ separated by thin sheets of metal of cylindrical or segmental form $c\ c$ placed between each ring of rubber, may be employed as indicated in Figs. 2 and 3. The rubber is inclosed by a segmental covering of metal $d$ preferably made in two or more segmental pieces as shown by Fig. 6, and the said segmental pieces may be made in two lengths. When the segmental metal covering $d$ is placed over and around the rubber, the bush or box, rubber, and segmental covering are inserted into the hub $e$ of the wheel and secured therein in the ordinary manner. We prefer that the rubber should be applied in two separate lengths, and between each length we prefer to place a spacing flange of metal $f$ formed on the outside of the box or bush, and also a flange of metal $g$ formed on the inside of the segmental metal covering $d$. The outer flanges are side by side when the several parts are in position, and the outer flanges are formed so as to inclose the outer ends of the rubber, and thus the latter is prevented from spreading out under pressure, each piece (see Fig. 1) or each series of pieces of rubber being held in a box formed by the box or bush, the segmental covering and the flanges.

In Fig. 1 the oil well $h$ is shown as being outside the hub $e$ being formed in the boss or flange of the box or bush. Any oil which may escape from the oil well or axle is prevented from getting in contact with the rubber by means of the ridges or flanges $i\ i$ formed on the outside of the flange. In Fig. 2 the oil well is shown about the center, the box or bush being made larger at this point to allow of the well being cut therein.

In lieu of the flanges $f$ thin metal washers or rings may be employed which answer the purpose of said flanges. The flange $j$ may be fixed on the box or bush $a$, or be detachable therefrom, as preferred. In preferably the center flange of the box or bush we form a recess (see Fig. 5) and on the flange $g$ we form a projection $l$, which projection is received in the recess $k$ and prevents the parts turning round or getting out of correct position though a limited amount of play is allowed.

What we claim is—

1. In vehicle wheels the combination of a box or bush, a series of surrounding rubber rings or strips separated by thin metallic sheets, the whole inclosed by a segmental outer covering, substantially as described.

2. In vehicle wheels the combination of a box or bush provided with a recessed flange, a covering of rubber and a segmental outer covering provided with a projection adapted to play in the recess of box or bush flange, substantially as set forth.

In testimony whereof we have hereunto set our hands in the presence of two subscribing witnesses.

NATHAN SMITH.
JOHN HAYDOCK.

Witnesses:
JOSEPH BRIERLEY,
*Civil Engineer, Wellington Street, Blackburn.*
GEO. H. HOLT,
*Civil Engineer, Preston New Road, Blackburn.*